United States Patent

Noguchi et al.

[11] Patent Number: 5,497,293
[45] Date of Patent: Mar. 5, 1996

[54] SURFACE ILLUMINANT DEVICE

[75] Inventors: Nobuhisa Noguchi, Ohmiya; Jun Tamaki, Kawaguchi, both of Japan

[73] Assignee: Enplas Corporation, Japan

[21] Appl. No.: 244,673

[22] PCT Filed: Apr. 22, 1994

[86] PCT No.: PCT/JP94/00675

§ 371 Date: Jun. 7, 1994

§ 102(e) Date: Jun. 7, 1994

[51] Int. Cl.$^6$ .................................................... F21V 8/00
[52] U.S. Cl. ............................ 362/31; 362/26; 362/330; 362/457
[58] Field of Search ............................. 362/26, 27, 31, 362/330, 457, 257

[56] References Cited

U.S. PATENT DOCUMENTS

| | | | |
|---|---|---|---|
| 3,132,810 | 5/1964 | Ostensen | 362/31 |
| 4,918,578 | 4/1990 | Thompson | 362/31 |
| 5,050,046 | 9/1991 | Tada | 362/31 |
| 5,150,960 | 9/1992 | Redick | 362/31 |
| 5,211,464 | 5/1993 | Bohmer | 362/31 |
| 5,335,100 | 8/1994 | Obata | 362/27 |

FOREIGN PATENT DOCUMENTS

| | | | |
|---|---|---|---|
| 5-297813 | 11/1993 | Japan . | |
| 786576 | 11/1957 | United Kingdom | 362/31 |

*Primary Examiner*—Ira S. Lazarus
*Assistant Examiner*—Alan B. Cariaso
*Attorney, Agent, or Firm*—Graham & James

[57] ABSTRACT

A surface illuminant device which is usable as a backlight for liquid crystal display units and does not allow a light diffusing sheet 2 or a reflecting sheet 4 to be slackened due to variations of temperature and humidity. Collars 6a and 6b of a holder 6 are disposed on surfaces of a light transmitter 1 opposed to each other so that a gap slightly larger than thickness of the light diffusing sheet 2 is formed between the collar 6a of the holder 6 and a surface of emergence 1a of the light transmitter 1, and a gap slightly larger than thickness of the reflecting sheet is formed between the surface 1b opposed to the surface of emergence 1a of the light transmitter 1 for allowing ends of the light diffusing sheet and the reflecting sheet to be freely movable within a predetermined range in the gaps, whereas the other ends of the light diffusing sheet and the reflecting sheet are fixed to the light transmitter 1 by fixing means 3, 5, 10 and 14.

11 Claims, 2 Drawing Sheets

SURFACE ILLUMINANT DEVICE

TECHNICAL FIELD

The present invention relates to a surface illuminant device to be used, for example, as a backlight for liquid crystal display units, and more specifically a surface illuminant device which uses a light transmitter.

BACKGROUND ART

FIG. 1 is a sectional view exemplifying a conventional surface illuminant device using the light transmitter. In this drawing, the reference numeral 1 represents a rectangular plate-like light transmitter having adequate thickness and a proper area; 2 is a light diffusing sheet mounted on a surface of emergence 1a of the light transmitter 1 in a condition where one end of the light diffusing sheet 2 is fixed, for example, with a double-adhesive tape 3 and having an area substantially the same as that of the light transmitter 1; and 4 is a reflecting sheet mounted on a surface 1b of the light transmitter 1 which is opposite to the surface of emergence 1a in a condition where one end of the reflecting sheet 4 is fixed, for example, with a double-adhesive tape 5 and having an area substantially the same as that of the light transmitter 1. The reference numeral 6 designates a holder which has collars 6a and 6b sandwiching opposite ends of the light transmitter 1, the light diffusing sheet 2 and the reflecting sheet 4, extends along an end surface of incidence 1c of the light transmitter 1 so as to cover the ends of the light transmitter 1, the light diffusing sheet 2 and the reflecting sheet 4 and has a substantially toric sectional shape; and 7 is a slender light source such as a cold cathode ray tube which is fixed to the holder 6 by an adequate means and extends along the surface of incidence 1c of the light transmitter 1. The reference numeral 8 denotes a bolt inserted through holes which are coaxially bored through the collar 6a, the light diffusing sheet 2, the light transmitter 1, the reflecting sheet 4 and the collar 6b; and 9 is a nut which is screwed around an end of the bolt 8 protruding from a bottom surface of the collar 6b.

In the surface illuminant device which is configured as described above, rays emitted from the light source 7 travel toward the end surface of incidence 1c directly from the light source 7 or after being reflected by a reflecting surface formed as an inside surface of the holder 6, enter the light transmitter 1 from the end surface of incidence 1c and propagate through the light transmitter 1. In the light transmitter 1, the incident rays are reflected by the reflecting sheet 4 or inside surfaces of the light transmitter 1, thereafter emerging from the surface of emergence 1a. Since the rays are diffused by the light diffusing sheet 2 while transmitting therethrough, this surface of the light diffusing sheet 2 can be used as a surface light source.

Such a surface illuminant device may ordinarily be used in environments kept at high temperature or high humidity. When the conventional surface illuminant device is used in such environments, the light transmitter 1, the light diffusing sheet 2 and the reflecting sheet 4 which have coefficients of linear expansion different from one another are expanded or contracted at ratios different from one another, whereby the light diffusing sheet 2 and/or the reflecting sheet 4 may be slackened. In such a case, the rays emerging from the surface of emergence 1a of the light transmitter 1 are influenced so as to constitute a cause for an ununiform luminance distribution on the surface illuminant device.

For solving this problem, it has conventionally been practised to dispose the light diffusing sheet 2 and the reflecting sheet 4 in a condition where opposite ends of the light diffusing sheet 2 and the reflecting sheet 4 are kept free or not fixed. When the light diffusing sheet 2 and the reflecting sheet 4 are disposed in such a condition, however, the light diffusing sheet 2 and/or the reflecting sheet 4 may tear off the surface of emergence 1a of the light transmitter 1 under certain kinds of circumstances, thereby allowing dust or foreign matters to enter a gap and/or gaps formed between the light diffusing sheet 2 and the surface of emergence 1a of the light transmitter 1 and/or between the surface of emergence 1a of the light transmitter 1 and the reflecting sheet 4 before the surface illuminant device is built into a casing. The dust or the foreign matters intercept the rays which are to emerge from the surface of emergence 1a of the light transmitter 1, thereby lowering luminance on the surface illuminant device.

In view of the problem described above, it is a primary object of the present invention to provide a surface illuminant device which is configured so as to prevent the light diffusing sheet and the reflecting sheet from tearing off the light transmitter, and allows no dust or foreign matter to enter between the light transmitter and either of these sheets without fixing an end thereof.

Another object of the present invention is to provide a surface illuminant device which is composed of parts in a number smaller than that of the parts required for composing the conventional surface illuminant device and can be assembled more easily than the conventional surface illuminant device.

DISCLOSURE OF INVENTION

In the surface illuminant device according to the present invention, the collars of the holder are disposed facing respective surfaces of the light transmitter opposed to each other so as to leave a gap slightly larger than thickness of the light diffusing sheet and a gap slightly larger than the thickness of the reflecting sheet respectively between one of the collars of the holder and the surface of emergence of the light transmitter and between the other collar of the holder and the surface of the light transmitter opposed to the surface of emergence, and ends of the light diffusing sheet and the reflecting sheet near the holder are respectively arranged in the gaps so as to be allows to move within a predetermined range, and the opposite ends of the light diffusing sheet and the reflecting sheet are fixed to the light transmitter by fixing means. Accordingly, the ends of the light diffusing sheet and the reflecting sheet near the holder are freely movable relative to the light transmitter and cannot be slackened even when the light diffusing sheet, the light transmitter and the reflecting sheet are expanded or contracted at different ratios due to variations of temperature and/or humidity.

Further, a tip of a bolt which is to be used for fixing the collars of the holder to the light transmitter is screwed directly to one of the collars. Thus, the surface illuminant device according to the present invention requires no nut and can be assembled in simple procedures.

BEST MODE FOR CARRYING OUT THE INVENTION

Figure 1:
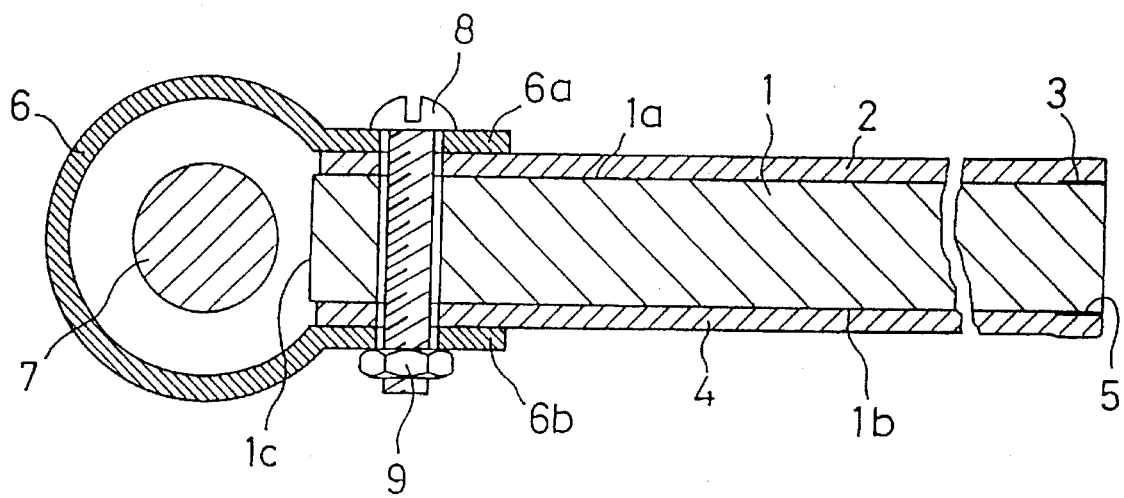
FIG. 1 is a sectional view exemplifying a conventional surface illuminant device using a light transmitter.

Now, the present invention will be described in detail below with reference to the preferred embodiments illustrated in the accompanying drawings using the reference numerals of the parts of the conventional surface illuminant device described above for members and parts of the surface illuminant device according to the present invention which are the same or substantially the same as those of the conventional surface illuminant device.

Figure 2:
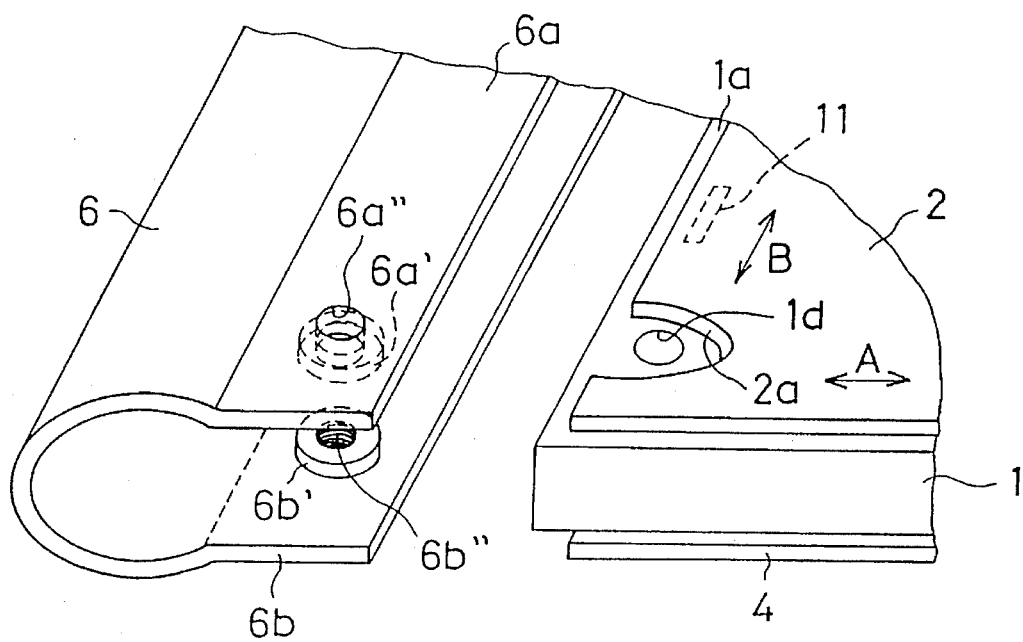
FIG. 2 is a perspective View illustrating main parts of an embodiment of the surface illuminant device according to the present invention in a disassembled condition thereof.
Figure 3:
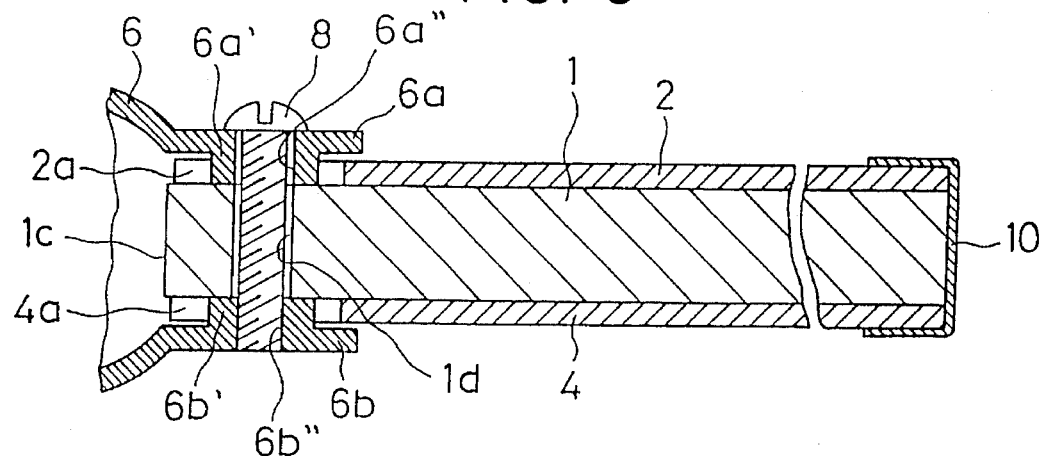
FIG. 3 is a sectional view illustrating main parts of the surface illuminant device shown in FIG. 2 in an assembled condition thereof.

In the first embodiment of the present invention, formed on an inside surface of the collar 6a of the holder 6 is a washer-like protrusion 6a' integrally with the collar 6a and a run-through hole 6a" is bored through the collar 6a and the protrusion 6a' as shown in FIGS. 2 and 3. Further, formed on the inside surface of the collar 6b of the holder 6 is a washer-like protrusion 6b' integrally with the collar 6b, and a tapped hole 6b" is bored in the protrusion 6b' and the collar 6b. The run-through hole 6a" is aligned with the tapped hole 6b" in a direction perpendicular to the planar surface of the light transmitter 1. This pair of the protrusion 6a' having the run-through hole and the protrusion 6b' having the tapped hole is formed actually in a plurality at predetermined intervals in a longitudinal direction of the collars 6a and 6b. On the side near the holder 6, there are formed notches 2a, for example in a semicircular shape which can loosely fit around the protrusions 6a' and 6b' of the holder 6, in an edge of the light diffusing sheet 2 at locations corresponding to the protrusions. Similar notches 4a are formed also in an edge of the reflecting sheet 4. As seen from FIG. 3, the protrusions 6a' and 6b' have heights which are a little larger than thickness of the light diffusing sheet 2 and that of the reflecting sheet 4 respectively. The reference numeral 10 (used in FIG. 3) represents a clip which is used for integrally fixing the opposite ends which are farther from the holder 6, of the light transmitter 1, the light diffusing sheet 2 and the reflecting sheet 4.

Now, description will be made of procedures to assemble the surface illuminant device preferred as the first embodiment described above.

First, the light diffusing sheet 2 and the reflecting sheet 4 are mounted on the surfaces of the light transmitter 1 which are opposite to each other, and the light transmitter and these sheets which make a layered structure, are integrally fixed by using the clip 10 at a portion on this layered structure. The light diffusing sheet 2 and the reflecting sheet 4 are temporarily fixed to the light transmitter 1 by thermal welding or with double-adhesive tapes 11 at the opposite end of the layered structure as schematically shown in FIG. 2. Then, the holder 6 is set so as to sandwich the light diffusing sheet 2 and the reflecting sheet 4 between the collars 6a and 6b, and adjusted so that the protrusions 6a' and 6b' are fitted into the notches 2a and 4a respectively, and the run-through holes 6a", the run-through holes 1d bored through the light transmitter 1 and the tapped holes 6b" are aligned with one another. The bolts 8 are inserted from above through the run-through holes 6a" and 1d, and screwed into the tapped hole 6b" for fixing the holder 6 to the light transmitter 1. The temporary fixing by the thermal welding or with the double-adhesive tapes 11 is done to prevent the light diffusing sheet 2 and the reflecting sheet 4 from tearing off the surfaces of the light transmitter 1 during the assembly works since gaps formed by slackening of the sheets may allow dust or foreign matters to enter between the light transmitter 1 and the sheets or constitute a cause for contamination of the light diffusing sheet 2 with fingerprints. Further, the temporary fixing is made at extremely narrow areas so that the light diffusing sheet 2 and the reflecting sheet 4 can easily be peeled off the light transmitter 1 when, after the assembly process, changes in temperature or humidity expand or contract these sheets be displaced relative to the light transmitter 1 in the direction indicated by the arrow A or B shown in FIG. 2. It is general that the light transmitter 1 is made of a methacrylic resin, the light diffusing sheet is made of polycarbonate and the reflecting sheet 4 is made of an expanded material mainly consists of polyethylene terephthalate. The methacrylic resin is expanded or contracted much more remarkably than polycarbonate or polyethylene terephthalate due to humidity variations.

The first embodiment of the surface illuminant device according to the present invention, which has the configuration described above, allows the light diffusing sheet 2 and the reflecting sheet 4 to move freely relative to the light transmitter 1 in the directions indicated by the arrows A and B in FIG. 2 when the light transmitter 1, the light diffusing sheet 2 and the reflecting sheet 4 are expanded or contracted at different ratios due to variations of temperature and humidity. Accordingly, the light diffusing sheet 2 and the reflecting sheet 4 which are rigid to certain degrees cannot be slackened. Further, the light diffusing sheet 2 and the reflecting sheet 4 which are kept in the conditions where they are fitted in the collars 6a and 6b respectively with narrow gaps cannot slip out of the collars. As a result, variations of temperature and humidity cannot constitute causes for ununiform luminance distributions on the surface illuminant device preferred as the first embodiment of the present invention.

Figure 4:
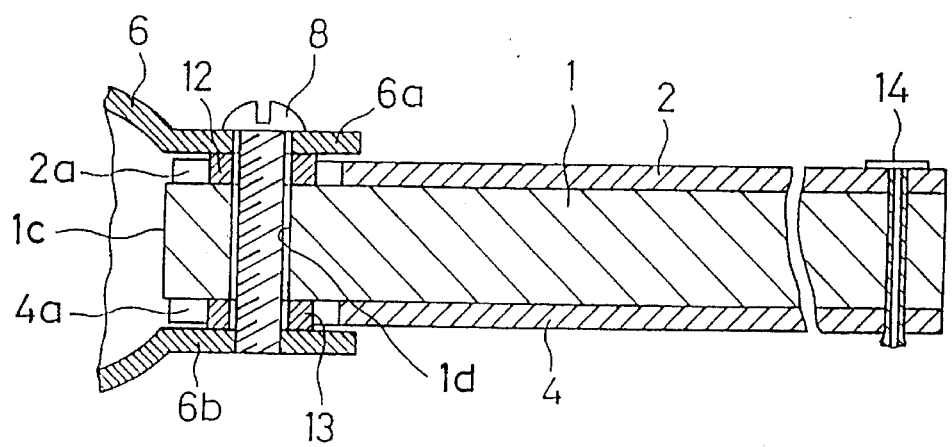
FIG. 4 is a sectional view illustrating main parts of another embodiment of the surface illuminant device according to the present invention.

FIG. 4 shows a second embodiment of the surface illuminant device according to the present invention. In the second embodiment, which is different from the first embodiment in some points, the protrusions 6a' and 6b' are formed as washers 12 and 13 respectively which are separate from the collars 6a and 6b, the tip of the bolt 8 is screwed to the collar 6b only, and the light transmitter 1, the light diffusing sheet 2 and the reflecting sheet 4 are integrally fixed with a plastic rivet 14. Functions and effects of the second embodiment are substantially the same as those of the first embodiment, and will not be described in particular.

Figure 5:
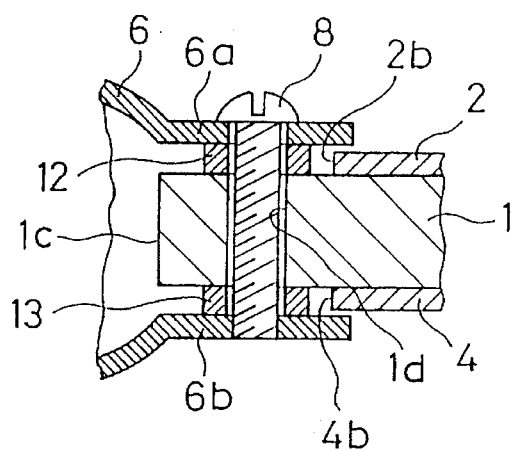
FIG. 5 is a sectional view illustrating main parts of still another embodiment of the surface illuminant device according to the present invention.

FIG. 5 illustrates a third embodiment of the surface illuminant device according to the present invention. In the third embodiment which is different from the second embodiment only in one point, the light diffusing sheet 2 and the reflecting sheet 4 are preliminarily mounted on the light transmitter 1 so that they have edges at locations at a predetermined distance from the washers 12 and 13 respectively on the side of the holder 6. Functions and effects of the third embodiment will not be described in particular since they are substantially the same as those of the first embodiment and the second embodiment which have already been described above.

Figure 6:
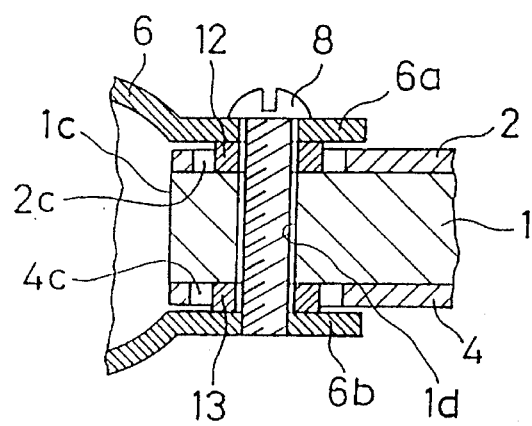
FIG. 6 is a sectional view illustrating main parts of a still further embodiment of the surface illuminant device according to the present invention.

FIG. 6 shows a fourth embodiment of the surface illuminant device according to the present invention. In the fourth embodiment which is different from the second embodiment or the third embodiment only in one point, openings 2c and 4c which are larger by a predetermined value in diametrical length than the washers 12 and 13 are formed in the end of the light diffusing sheet 2 and the reflecting sheet 4 respectively on the side near the holder 6. Functions and effects of the fourth embodiment are substantially the same as those of the embodiments already described above and will not be described in particular.

The ends of the light transmitter 1, the light diffusing sheet 2 and the reflecting sheet 4 which are located on the side opposite to the holder 6 can be fixed with an adequate mechanical means such as a screw in place of the double-adhesive tapes 3 and 5 or the thermal welding adopted for the embodiments described above. Though the run-through holes and the tapped holes are bored in the collars 6a and 6b respectively for inserting the bolts 8 from above in the embodiments described above, it is possible to bore the tapped holes and the run-through holes in the collars 6a and 6b respectively so that the bolts 8 can be inserted from down side.

Further, it is possible to select an adequate combination of the manners of the embodiments described above which are selected for disposing the ends of the light transmitter 1, the light diffusing sheet 2 and the reflecting sheet 4 so that the light diffusing sheet 2 and the reflecting sheet 4 are movable relatively to the light transmitter 1 between the collars 6a and 6b on the side of the holder 6.

Fundamental functions of the surface illuminant devices preferred as the embodiments of the present invention are substantially the same as those of the conventional surface illuminant device and will not be explained in particular.

INDUSTRIAL APPLICABILITY

As understood from the foregoing description, the surface illuminant device according to the present invention is effectively useful as a backlight for liquid crystal display units.

What is claimed is:

1. A surface illuminant device comprising:

a light source;

a light transmitter having an incident end face disposed in a vicinity of said light source;

a holder accommodating said light source and serving for condensing rays emitted from said light source onto said incident end face of said light transmitter;

a light diffusing sheet mounted on an upper side surface of said light transmitter; and a reflecting sheet disposed on a lower side surface of said light transmitter, wherein a layered structure .consisting of said light transmitter, said light diffusing sheet and said reflecting sheet, is integrally fixed by fixing means at a portion of a first end zone of said layered structure opposite to said incident end face, and wherein said holder is attached to said layered structure by a plurality of attaching means in such a manner that a second end zone of said layered structure opposite to said first end zone and including said incident end face of said light transmitter is enclosed between an upper end portion and a lower end portion of said holder, with end edges of said light diffusing sheet and said reflecting sheet located in said second end zone being laid respectively underneath said upper end portion and said lower end portion, with respective minimum spaces kept between said upper end portion of said holder and said light diffusing sheet and between said lower end portion of said holder and said reflecting sheet for allowing movement of said light diffusing sheet and said reflecting sheet relative to said light transmitter in directions along the upper side and lower side surfaces of said light transmitter except at said portion fixed by said fixing means.

2. A surface illuminant device according to claim 1 wherein said fixing means consists of a double-adhesive tape interposed between said light transmitter and said light diffusing sheet, and another double-adhesive tape interposed between said light transmitter and said reflecting sheet.

3. A surface illuminant device according to claim 1 wherein said fixing means is a clip or a plastic rivet.

4. A surface illuminant device according to claim 1 or 2 wherein said upper end portion and said lower end portion of said holder are formed as a pair of collars comprising an upper collar and a lower collar for sandwiching said layered structure, and wherein said attaching means comprises a plurality of upper protrusions formed on said upper collar integrally therewith or separately therefrom having a height larger than the thickness of said light diffusing .sheet and having run-through holes bored therein so as to be placed on said layered structure, a plurality of lower protrusions formed on said lower collar integrally therewith or separately therefrom having a height larger than the thickness of said reflecting sheet and having tapped holes bored therein and disposed opposite said upper protrusions on said layered structure, and a plurality of bolts inserted through said upper protrusions utilizing the run-through holes bored therein and through said light transmitter, and screwed to said lower protrusions utilizing the tapped holes bored therein, and wherein a plurality of notches are formed on said light diffusing sheet and said reflecting sheet in said second end zone so as to be aligned with said upper protrusions and said lower protrusions, said upper protrusions and said lower protrusions being respectively surrounded loosely and at least partially by respective border edges of said light diffusing sheet and said reflecting sheet, so that said light diffusing sheet and said reflecting sheet with which said notches are bordered have no contact with said upper protrusions and said lower protrusions respectively.

5. A surface illuminant device according to claim 1 or 2 wherein said upper end portion and said lower end portion of said holder are formed as a pair of collars, comprising an upper collar and a lower collar for sandwiching said layered structure, wherein said attaching means comprises a plurality of upper protrusions formed on said upper collar integrally therewith or separately therefrom having a height larger than the thickness of said light diffusing sheet and having tapped holes bored therein so as to be placed on said layered structure, a plurality of lower protrusions formed on said lower collar integrally therewith or separately therefrom having a height larger than the thickness of said reflecting sheet and having run-through holes bored therein and disposed opposite said upper protrusions, on said layered structure, and a plurality of bolts inserted through said lower protrusions utilizing the run-through holes bored therein and through said light transmitter, and screwed to said upper protrusions utilizing the tapped holes bored therein, and wherein a plurality of notches are formed on said light diffusing sheet and said reflecting sheet in said second end zone so as to be aligned with said upper protrusions and said lower protrusions, said upper protrusions and said lower protrusions being respectively surrounded loosely and at least partially by respective border edges of said light diffusing sheet and said reflecting sheet with which said notches are bordered, so that said light diffusing sheet and said reflecting sheet have no contact with said upper protrusions and said lower protrusions respectively.

6. A surface illuminant device according to claim 4 wherein said notches are holes separated from the end edges of said light diffusing sheet and said reflecting sheet.

7. A surface illuminant device according to claim 4 wherein said notches are concavities cut from the end edges of said light diffusing sheet and said reflecting sheet in said second end zone.

8. A surface illuminant device according to claim 1 or 2 wherein said upper end portion and said lower end portion of said holder are formed as a pair of collars comprising an upper collar and a lower collar for sandwiching said layered structure, wherein said attaching means comprises a plurality of upper protrusions formed on said upper collar integrally therewith or separately therefrom having a height larger than the thickness of said light diffusing sheet and having run-through holes bored therein so as to be placed on said layered structure, a plurality of lower protrusions formed on said lower collar integrally therewith or separately therefrom having a height larger than the thickness of said reflecting sheet and having tapped holes bored therein so as to be placed, opposite said upper protrusions, on said layered structure, and a plurality of bolts inserted through said upper protrusions utilizing the run-through holes bored therein and through said light transmitter, and screwed to said lower protrusions utilizing the tapped holes bored therein, and wherein said light diffusing sheet and said reflecting sheet are disposed so that the respective end edges thereof in said second end zone are located more inwardly than said upper protrusions and said lower protrusions on the upper side and lower side surfaces of said light transmitter.

9. A surface illuminant device according to claim 1 or 2 wherein said upper end portion and said lower end portion of said holder are formed as a pair of collars comprising an upper collar and a lower collar for sandwiching said layered structure, wherein said attaching means consist of a plurality of upper protrusions formed on said upper collar integrally therewith or separately therefrom having a height larger than the thickness of said light diffusing sheet and having tapped holes bored therein so as to be placed on said layered structure, a plurality of lower protrusions formed on said lower collar integrally therewith or separately therefrom having a height larger than the thickness of said reflecting sheet and having run-through holes bored therein so as to be placed, opposite said upper protrusions, on said layered structure, and a plurality of bolts inserted through said lower protrusions utilizing the run-through holes bored therein and through said light transmitter, and screwed to said upper protrusions utilizing the tapped holes bored therein, and wherein said light diffusing sheet and said reflecting sheet are disposed so that the respective end edges thereof in said second end zone are located more inwardly than said upper protrusions and said lower protrusions on the upper side and lower side surfaces of said light transmitter.

10. A surface illuminant device according to claim 5 wherein said notches further comprise holes separated from the end edges of said light diffusing sheet and said reflecting sheet.

11. A surface illuminant device according to claim 5 wherein said notches further comprise concavities cut from the end edges of said light diffusing sheet and said reflecting sheet in said second end zone.

* * * * *